United States Patent [19]
Podolan et al.

[11] 3,713,689
[45] Jan 30, 1973

[54] VEHICLE BODY RETRACTABLE TOP

[75] Inventors: Edward G. Podolan; Francis C. Przybysz, both of Utica, Mich.

[73] Assignee: General Motors Corporation, Detroit, Mich.

[22] Filed: Sept. 14, 1971

[21] Appl. No.: 180,409

[52] U.S. Cl. .............................................296/137 B
[51] Int. Cl. ................................................B60j 7/10
[58] Field of Search.............296/137 B, 137 E, 137 F

[56] References Cited

UNITED STATES PATENTS

| | | | |
|---|---|---|---|
| 3,603,636 | 9/1971 | Carella | 296/137 B |
| 2,772,917 | 12/1956 | Goldman | 296/137 F |

*Primary Examiner*—Benjamin Hersh
*Assistant Examiner*—Robert R. Song
*Attorney*—W. E. Finken et al.

[57] ABSTRACT

A vehicle body includes a fixed roof panel adjacent the rear end of the occupant compartment and cooperable with the windshield header to define an occupant compartment roof opening selectively closed by a retractable top including movable front and rear roof panels. A pair of mounting rails have their forward ends affixed to the opposite lateral sides of the rear panel while their rearward ends support respective pairs of rollers received within respective body mounted channel members to mount the rear panel for generally translatory movement between a rearward storage position below the fixed roof panel and a forward raised position closing the rear portion of the roof opening. A pair of longitudinally extending channel members also affixed to the opposite lateral sides of the rear panel slidably support respective linkage mechanisms including four-bar linkages which are connected to the lateral sides of the front panel. With the rear panel held in the storage position by a pair of vehicle body mounted latch mechanisms respectively engaging the mounting rails, the linkage mechanisms are positioned at the rearward ends of the rear panel mounted channel members and the four-bar linkages assume released positions locating the front panel generally below and in a spaced relationship to the rear panel to define a storage position of the top. A pair of drive rails have their forward ends pivoted to respective locking links of the linkage mechanisms and have their rearward ends supported by roller arrangements movable longitudinally relative to the vehicle body along body mounted channel members. Conventional cable drive mechanisms connected to the roller arrangements are actuatable to move the drive rails forwardly and slide the front panel and linkage mechanisms forwardly along the stationary rear panel while control linkages of the linkage mechanisms maintain the four-bar linkages in the released positions and the locking links also in respective released positions. When the linkage mechanisms reach the forward ends of the rear panel mounted channel members, the control linkages allow the forwardly moving drive rails to move the four-bar linkages to locked positions and bodily shift the front panel upwardly to seal the panels and align respective front and rear drip rail portions on the opposite sides of the panels. As the four-bar linkages move to the locked positions, the locking links are moved to overcenter locking positions and pin and open ended slot connections between the drive rails and linkage mechanisms are interengaged to provide a driving connection between the drive rails and the linkage mechanisms. The latch mechanisms holding the rear panel in the storage position are cammed to unlatched positions concomitant with the locking of the locking links and four-bar linkages and allow the drive mechanisms to move the front and rear panels forwardly as a unit until the front panel engages the windshield header to thus provide a raised position in which the top closes the roof opening. The drive mechanisms are also actuatable to move the front and rear panels from the raised position rearwardly, with the panels moving as a unit until the rear panel reaches the storage position where the pin and slot connections are cammed out of engagement and move the locking links and four-bar linkages to the respective released positions. Thereafter, the drive mechanisms move the downwardly shifted front panel rearwardly as the linkage mechanisms slide rearwardly along the stationary rear panel mounted channel members and the top moves to the storage position.

5 Claims, 18 Drawing Figures

United States Patent [19]
Podolan et al.
[11] 3,713,689
[45] Jan 30, 1973
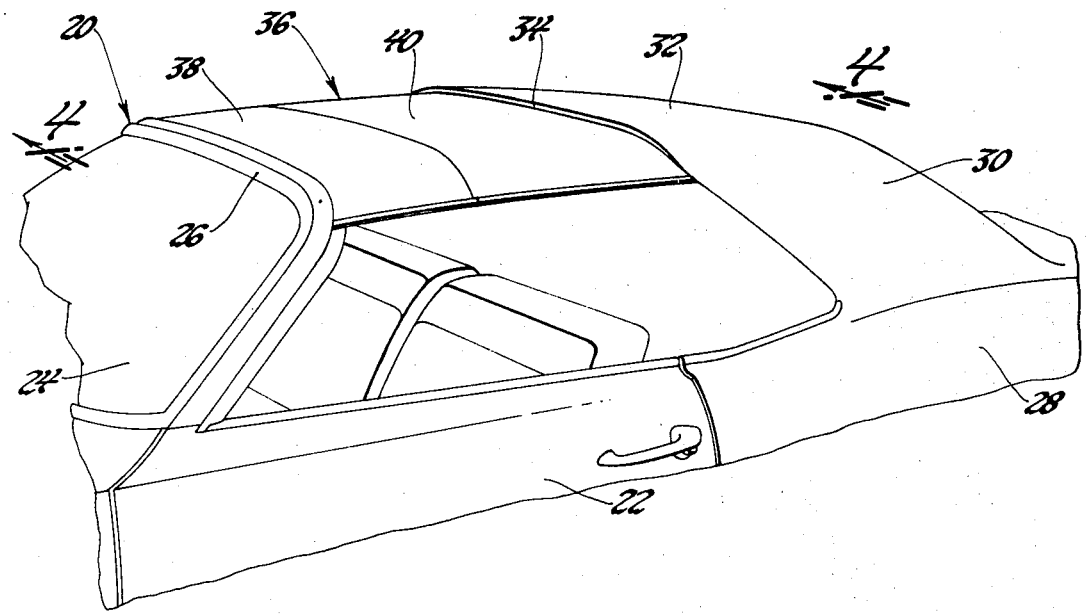

INVENTORS
Edward G. Podolan &
BY Francis C. Przybysz
Herbert Furman
ATTORNEY

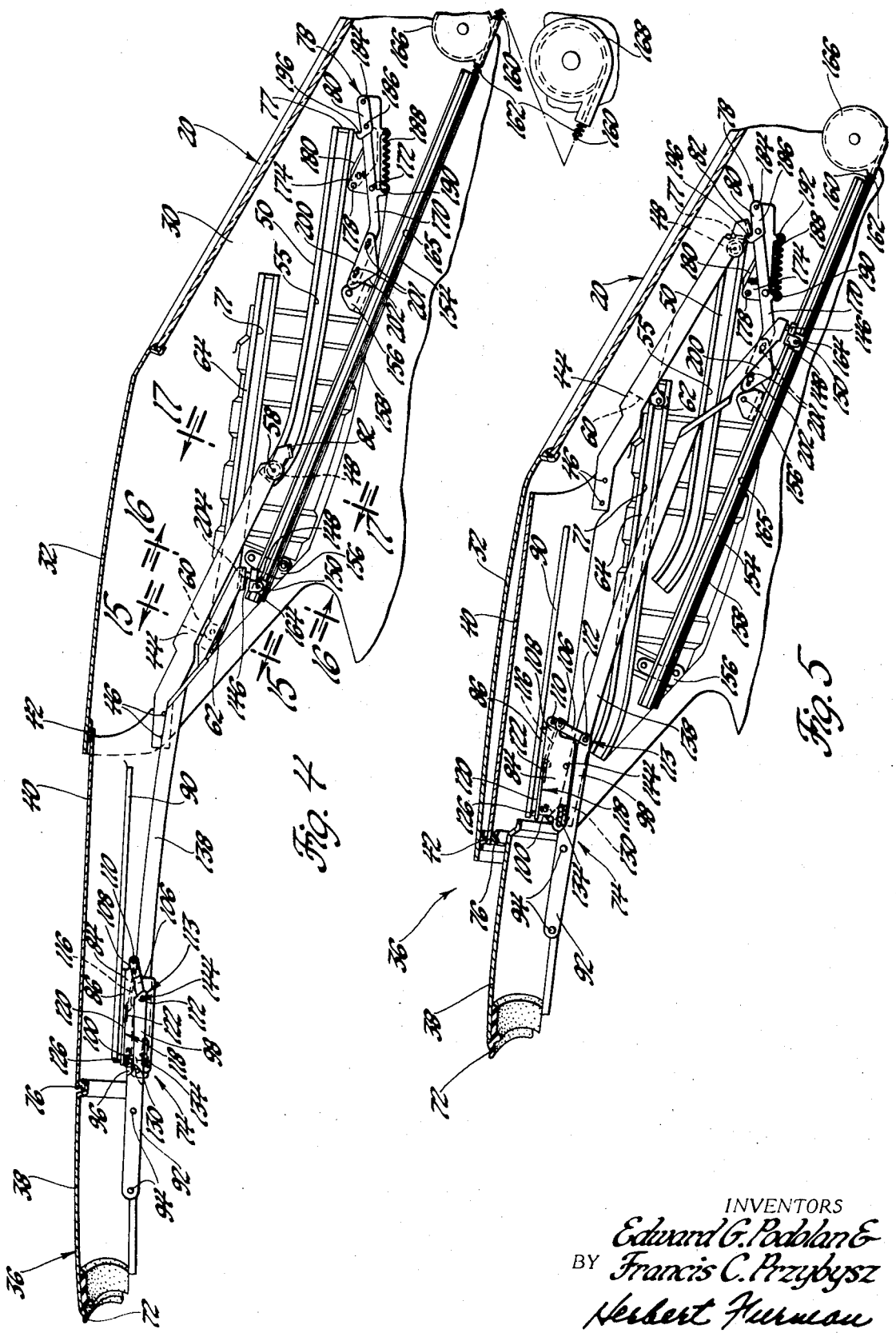

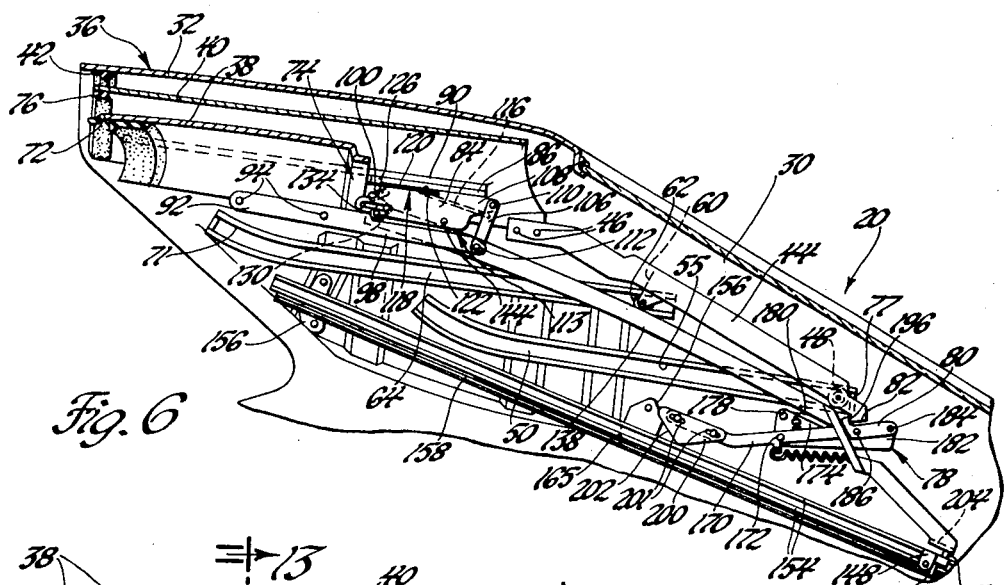
Fig. 6
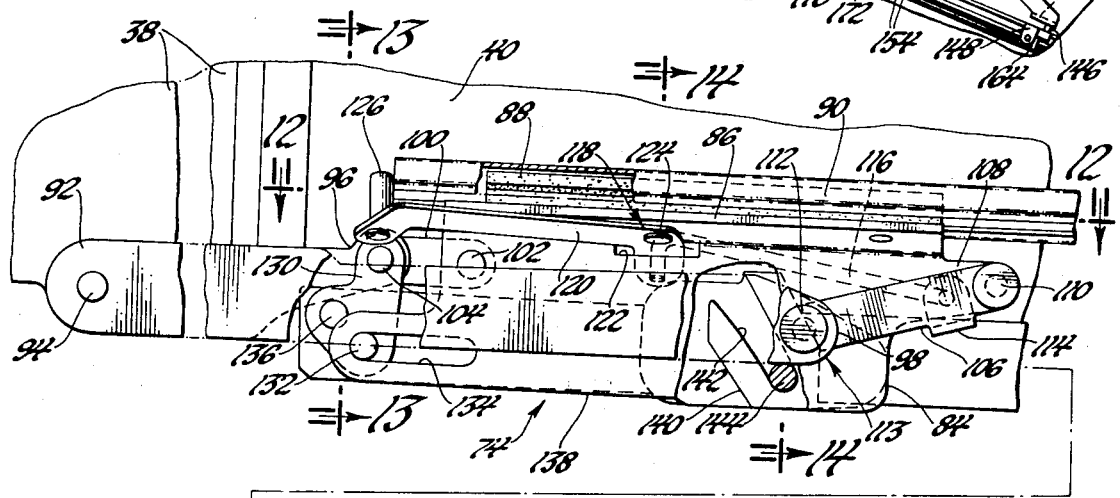
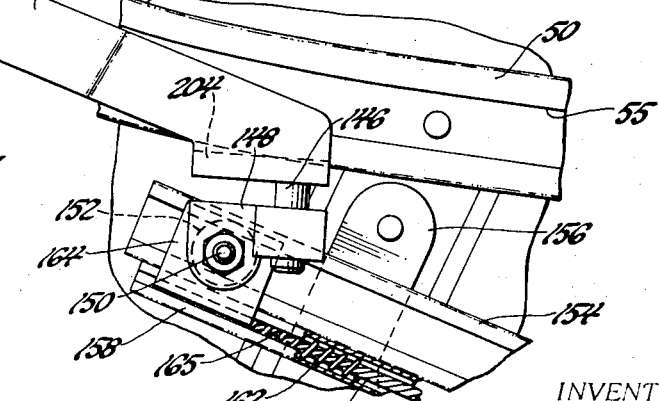
Fig. 7
INVENTORS
Edward G. Podolan &
BY Francis C. Przybysz
Herbert Furman
ATTORNEY INVENTORS
Edward G. Podolan &
BY Francis C. Przybysz
Herbert Furman
ATTORNEY

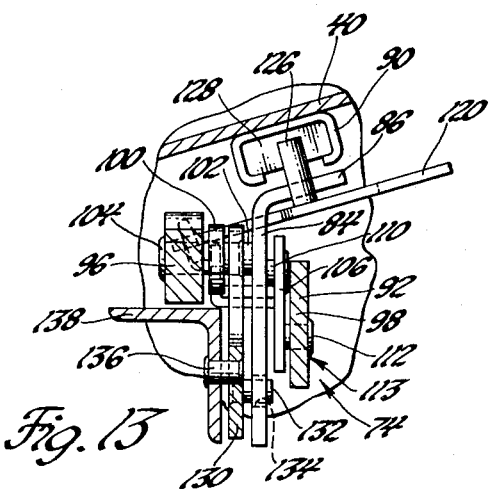

VEHICLE BODY RETRACTABLE TOP

This invention relates to a vehicle body retractable top including a plurality of panels movable between storage and raised positions and, more particularly, to a linkage mechanism for interconnecting the panels.

It is well known to provide vehicle body retractable tops in which a plurality of roof panels are movable in a generally telescopic manner from storage positions to raised positions to close roof openings of the vehicle body occupant compartments. With the tops in the raised positions closing the roof openings certain problems are presented in providing the required sealing engagement between the adjacent panels. Also, since the lateral edges of the panels are not continuous, it is not possible to achieve certain aesthetically appealing appearances or to provide conventional continuous side drip rails. Likewise, it is difficult to provide the lateral edges of the panels with continuous side seals that are sealingly engaged by the upper edges of the side door windows in their raised positions.

This invention provides a vehicle body retractable top in which a linkage mechanism mounts a movable front panel on a movable rear panel for generally translatory movement from a storage position forwardly to an intermediate position and then bodily shifts the front panel vertically to sealingly engage the panels and align the lateral edges of the panels.

In the preferred embodiment of the retractable top, the movable rear panel is mounted for longitudinal movement relative to the vehicle body by a pair of mounting rails and is held in a rearward storage position by a pair of latch mechanisms engageable with the mounting rails. The lateral edges of the rear panel fixedly support respective longitudinally extending channel members which slidably mount respective linkage mechanisms including four-bar linkages connected to and supporting the front panel. With the linkage mechanisms positioned at the rearward ends of the rear panel mounted channel members, the four-bar linkages assume release positions to position the front panel in a storage position generally below and in spaced relationship to the rear panel. A pair of drive rails have their rearward ends supported by respective roller arrangements movable along vehicle body mounted channel members by conventional drive mechanisms and have their forward ends pivoted to respective locking links of the linkage mechanisms. With the panels in the storage positions defining a storage position of the retractable top, the drive mechanisms are actuatable to move the drive rails and front panel forwardly while control linkages of the linkage mechanisms maintain the four-bar linkages in the released positions and also maintain the locking links in respective released positions. When the forwardly sliding linkage mechanisms reach the front ends of the rear panel mounted channel members, the control linkages allow the four-bar linkages to move to locked positions, shifting the front panel upwardly to seal against the rear panel and aligning respective front and rear drip rail portions on the lateral sides of the front and rear panels. As the four-bar linkages move to the locked positions, the locking links move to overcenter locking positions and pin and opened ended slot connections between the drive rails and the linkage mechanisms are interengaged to provide a driving connection between the drive rails and the linkage mechanisms. Concomitant with the locking of the panels relative to each other, the latch mechanisms holding the rear panel in the storage positions are cammed to unlatched positions and thereafter the front and rear panels move forwardly as a unit to a raised position of the top where the front panel engages the vehicle body windshield header and the top closes a roof opening of the vehicle body occupant compartment. With the top in raised position, the drive mechanisms are actuatable to move the front and rear panels rearwardly as a unit until the rear panel reaches the storage position, whereupon the pin and slot connections are cammed out of engagement and move the locking links and four-bar linkages to the respective released positions to shift the front panel downwardly. Thereafter, rearward movement of the drive rails slides the linkage mechanisms and the front panel rearwardly below the rear panel to move the top to the storage position.

Accordingly, an object of this invention is to provide an improved vehicle body retractable top in which front and rear movable roof panels are interconnected by a linkage mechanism which supports the front panel for generally longitudinal translatory movement relative to the rear panel between a storage position and an intermediate position from which the front panel is transistor. upwardly into sealing engagement with the rear panel with the lateral edges of the panels aligned to define a raised position of the top.

Another object of this invention is to provide such a retractable top in which the linkage mechanism includes a four-bar linkage movable from a released position to a locked position to shift the front panel upwardly as a locking link moves from a released position to an overcenter locking position to maintain the four-bar linkage in the locked position.

Another object of this invention is to provide such a retractable top in which a control linkage of the linkage mechanism maintains the four-bar linkage in the released position during the longitudinal translatory movement of the front panel relative to the rear panel.

Another object of this invention is to provide such a retractable top in which a drive rail moves the panels between the storage and raised positions with a pin and open ended slot connection between the linkage mechanism and drive rail for camming the locking link and four-bar linkage to their respective released positions during rearward movement of the top from the raised position to the storage position.

These and other objects of this invention will be readily apparent from the following detailed description and drawings in which:

FIG. 4 is an enlarged sectional view taken generally along line 4—4 of FIG. 1 and showing the linkage mechanism that interconnects the front and rear panels in a locked position with the top in a raised position;

FIG. 5 is a view similar to FIG. 4 but with the rear panel in storage position and with the linkage mechanism in a released position locating the front panel below and generally forward of the rear panel;

FIG. 6 is a view similar to FIG. 5 but with the front panel translated rearwardly to the storage position to define a storage position of the top;

FIG. 7 is an enlarged view of portions of FIG. 4 showing the linkage mechanism and an associated drive rail that moves the front and rear panels between the storage and raised positions;

FIG. 13 is a sectional view of the linkage mechanism taken generally along line 13—13 of FIG. 7;

FIG. 14 is a sectional view of the linkage mechanism taken generally along line 14—14 of FIG. 7;

FIG. 15 is an enlarged sectional view taken generally along line 15—15 of FIG. 4 and showing a vehicle body mounted channel member which slidably receives a roller of the rear panel mounting rail;

FIG. 16 is an enlarged sectional view taken generally along line 16—16 of FIG. 4 and showing a roller arrangement that supports the drive rail and the connection between the drive rail and a conventional cable drive mechanism;

FIG. 17 is an enlarged sectional view taken generally along line 17—17 of FIG. 4 and showing a roller adjacent the rear end of the rear panel mounting rail and a vehicle body mounted channel member receiving the roller and cooperable with the roller and channel member shown in FIG. 15 to mount the rear panel for movement longitudinally of the vehicle body; and FIG. 18 is a view showing a portion of the latch mechanism in a solid line indicated latched position engaging the rear end of the rear panel mounting rail and in a phantom line indicated unlatched position out of engagement with the mounting rail.

Figure 1:
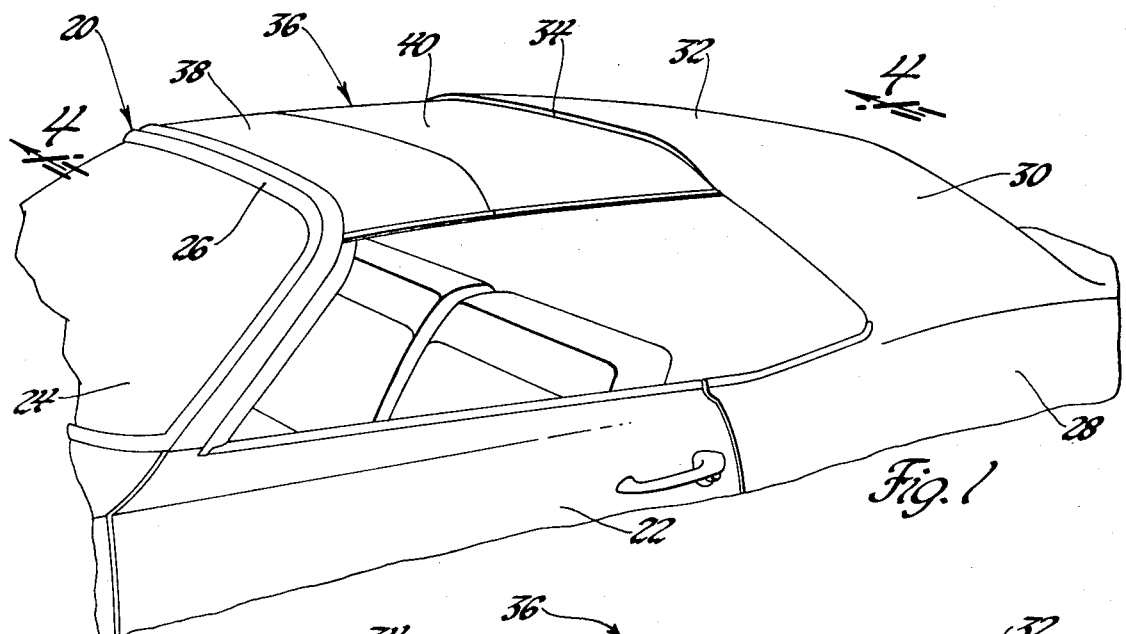
FIG. 1 is a perspective view of a portion of a vehicle body including a retractable top, according to the invention, with movable front and rear panels shown in a raised position.
Figure 2:
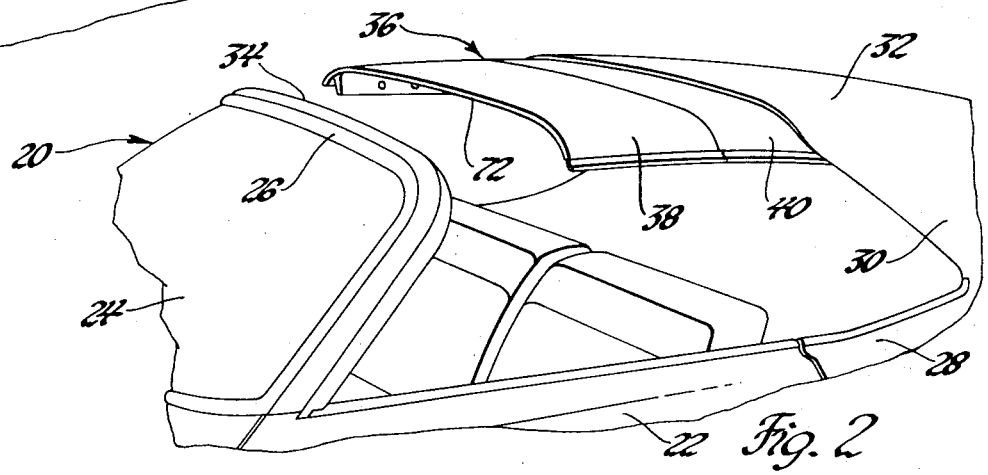
FIG. 2 is a view similar to FIG. 1 with the top moved partially toward a retracted storage position.
Figure 3:
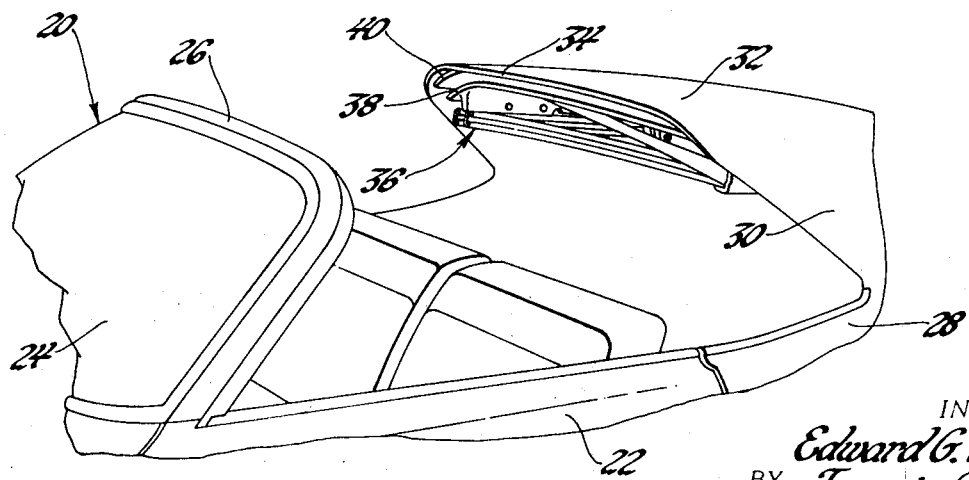
FIG. 3 is a view similar to FIG. 1 with the top shown in the retracted storage position.

Referring to the drawings and more particularly to FIGS. 1 through 3, a vehicle body generally indicated at 20 includes a side door 22, a windshield 24 with an associated windshield header 26, and a rear quarter panel 28 mounting a sail panel 30 which supports a fixed roof panel 32 extending laterally of the vehicle body. The windshield header 26 and the fixed panel 32 cooperate to define a roof opening 34 that is selectively closed by a retractable top 36 according to this invention. The retractable top 36 includes a movable front roof panel 38 and a movable rear roof panel 40 which are interconnected and moved from the raised position of FIG. 1 through the partially retracted position of FIG. 2 to the fully retracted storage position of FIG. 3 in a manner to be more fully hereinafter described.

Reference should now be made to FIG. 4 which shows the manner in which the right-hand lateral side of the front and rear panels 38 and 40 are supported for longitudinal movement between the raised position of FIG. 1 and the retracted storage position of FIG. 3, with the understanding that the left-hand lateral side of the front and rear panels are supported in a symmetrical manner and as such will not be further described. In the raised position of FIG. 4, the rear edge of rear panel 40 engages a conventional seal 42 mounted on the lower forward edge of fixed panel 32. Panel 40 is held in engagement with seal 42 by a mounting rail 44 whose forward end is secured to the panel by bolts or rivets 46. The rearward end of mounting rail 44 supports a roller 48 received within a generally longitudinally extending channel member 50, see also FIG. 17, welded at 52 to the sail panel 30. The roller 48 includes an annular groove 54 which receives an upper flange 55 of channel member 50 to retain the roller within the channel member. A spacer 56 is coaxial with a pin 58 supporting the roller on the mounting rail 44 and spaces the mounting rail laterally inboard of channel member 50. Intermediate the forward and rearward ends of mounting rail 44, a downwardly extending bracket 60 is suitably attached to the mounting rail and includes a lower end, see also FIG. 15, supporting a roller 62 received within a channel member 64 welded at 66 to sail panel 30. A pin 68 rotatably supports the roller 62 on bracket 60 and the roller includes an annular groove 70 receiving an upper flange 71 of channel member 64 to retain the roller within the channel member. Channel members 50 and 64 extend generally parallel to each other slightly tipped downwardly to the rear and at their forward ends include respective arcuate portions that are oriented in upwardly extending directions. The arcuate portion of channel member 50 has a radius of curvature slightly smaller than that of channel member 64. Consequently, as the front and rear panels 38 and 40 are moved forwardly as a unit, in a manner to be described, and approach the FIG. 4 top up or raised position, the mounting rail 44 and rollers 48 and 62 move longitudinally of the channel members 50 and 64 with the rear end of the mounting rail 44 moving upwardly faster than the intermediate portion adjacent bracket 60. This movement supplies a slight rotation to the mounting rail 44 and causes the forward end of front panel 38 to move forwardly and downwardly as a seal 72 along the lower front edge of panel 38 engages the windshield header 26 substantially concomitant with the engagement of the rear edge of rear panel 40 with the seal 42 mounted on panel 32. Conventional windshield header latch mechanisms, not shown, on front panel 38 are then selectively engageable with keepers on windshield header 26 to secure the front and rear panels 38 and 40 of the retractable top in the raised position of FIG. 4.

With the retractable top 36 in the raised position of FIG. 4, a linkage mechanism generally indicated by 74 assumes a locked position, as will be described, to position the rear edge of front panel 38 in engagement with a seal 76 mounted on the forward edge of rear panel 40. During the initial rearward movement of the retractable top 36 from the raised position of FIG. 4 toward the retracted storage position of FIG. 6, linkage mechanism 74 maintains the front and rear panels 38 and 40 in the FIG. 4 position relative to each other as the rollers 48 and 62 move rearwardly along their respective channel members 50 and 64. When the rear panel 40 reaches the retracted storage position as in FIG. 5, roller 48 engages a stop 77 at the rear end of channel member 50 and linkage mechanism 74 is moved to a released position, as will be described, to shift the front panel 38 downwardly with respect to the rear panel 40 to the position shown. Thereafter, the front panel 38 moves rearwardly in a generally translatory manner from the position of FIG. 5 to the storage position of FIG. 6. A latch mechanism generally indicated at 78 includes a bolt 80 that engages a keeper 82 on the rear end of mounting rail 44 when the retractable top 36 is in the FIG. 6 storage position. Consequently, as the front panel 38 is moved forwardly from the position of FIG. 6 to the position of FIG. 5, latch mechanism 78 maintains the rear panel 40 in the storage position below fixed panel 32. When the forwardly moving front panel 38 reaches an intermediate position, as in FIG. 5, the linkage mechanism 74 bodily shifts the front panel 38 upwardly into engagement with the seal 76 on rear panel 40. Concomitant with the upward movement of panel 38 and movement of the linkage mechanism 74 to the locked position, the latch mechanism 78 is cammed to an unlatched position, as will be described, such that the front and rear panels 38 and 40 thereafter move forwardly as a unit to the FIG. 4 raised position of the retractable top. Since the front panel 38 translates in a generally spaced relationship with respect to the rear panel 40 during movement between the positions of FIGS. 5 and 6, it is possible for the lateral edge portions of the panels to be aligned in the raised position of the top. This alignment allows the panels 38 and 40 to be constructed with drip rail portions which cooperate to provide continuous drip rails along the lateral sides of retractable top 36. The alignment also allows the panels 38 and 40 to support respective seal portions that align to provide continuous seals at the opposite sides of the top, thus preventing sealing problems where the upper edges of the vehicle body side door windows engage the seals at the juncture between the panels.

Figure 8:
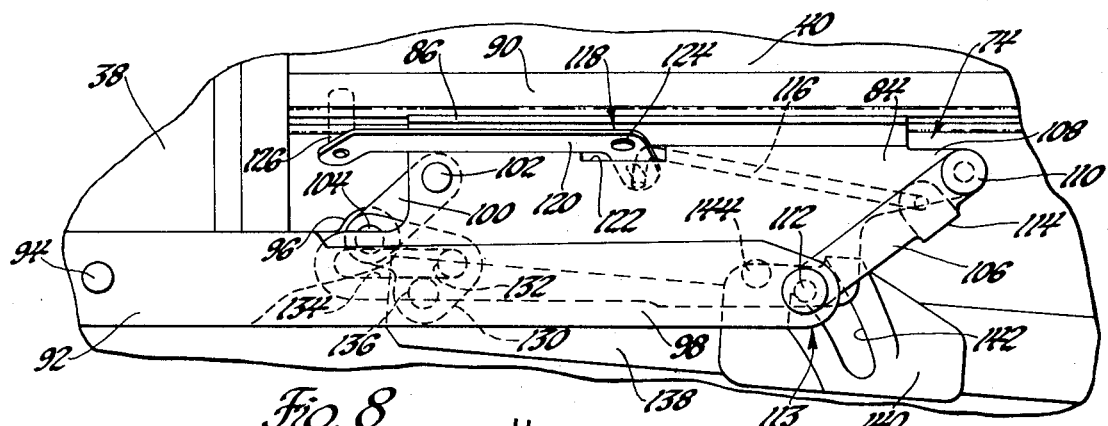
FIG. 8 is a view of a portion of the linkage mechanism as in FIG. 7 but in a released position.
Figure 12:
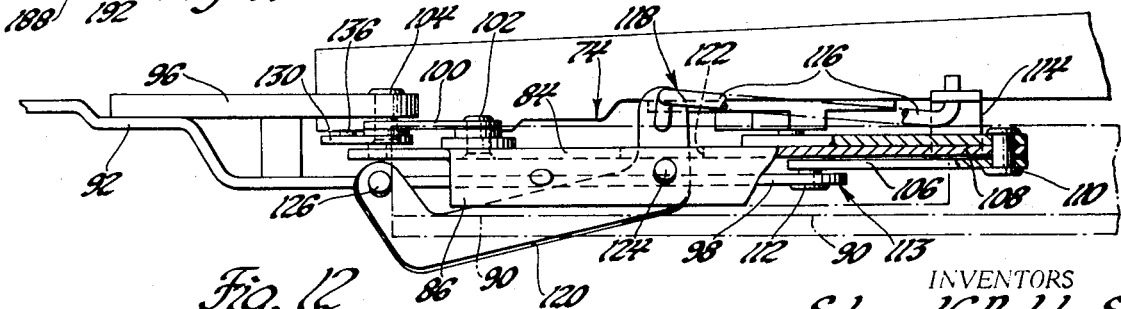
FIG. 12 is a plan view of the linkage mechanism taken generally along line 12—12 of FIG. 7 and showing a rear panel mounted channel member that slidably supports the linkage mechanism on the rear panel by phantom lines.

Referring to FIGS. 7 and 8, linkage mechanism 74 includes a mounting plate 84 oriented generally within a vertical plane and with an integral upper flange 86, see also FIGS. 13 and 14, that extends inboard of the vehicle body from the mounting plate. FIGS. 7 and 14 show a plastic slide member 88 that is suitably mounted on the upper side of flange 86 and received within a downwardly opening channel member 90 suitably fixedly secured to the lower side of rear panel 40 and extending longitudinally of vehicle body 20. As the front panel 38 translates in spaced relationship to the rear panel 40, slide member 88 slides within channel member 90 to thus slidably support the linkage mechanism 74 on rear panel 40. As seen in FIGS. 6 and 7, a bracket 92 of linkage mechanism 74 is secured to the front panel 38 by bolts or rivets 94 and includes a pair of rearwardly extending legs 96 and 98, the inboard leg 96 being the shorter of the two, see also FIG. 12. A link 100 has one end pivoted by a pin 102 to the forward end of mounting plate 84 and the other end pivoted by a pin 104 to the shorter leg 96. A second link 106 has one end pivoted to a rearwardly extending leg 108 of mounting plate 84 by a pin 110. The other end of link 106 is pivoted to the longer leg 98 of bracket 92 by a pin 112 such that the links 100 and 106, the bracket 92, and the mounting plate 84 provide a four-bar linkage 113 connecting panels 38 and 40.

When the front panel 38 is in the FIG. 6 retracted storage position, the four-bar linkage 113 is in the FIG. 8 released position to locate panel 38 in the spaced relationship shown relative to rear panel 40. The link 106 includes a laterally outboard extending tab 114, best seen in FIG. 12, which has an upwardly extending apertured flange receiving one offset end of a wire link 116. Link 116 is part of a control linkage generally indicated by 118 and has its other offset end received within an apertured end of a control link 120. The rear apertured end of control link 120 extends through an aperture 122 in mounting plate 84 and a pin 124 pivotally supports the control link 120 on the flange 86 of mounting plate 84 for pivotal movement about a generally vertical axis, see FIG. 14. From pin 124, the control link 120 extends forwardly and includes a lateral outboard extending front end fixedly supporting a control pin 126. When the front panel 38 is in the FIG. 5 position or rearward thereof, the control pin 126 engages the lateral outboard side of channel member 90, FIG. 8, and by way of the control linkage 118 prevents link 106 from pivoting clockwise about pin 110, and consequently prevents link 100 from pivoting clockwise about pin 102. This engagement thus maintains the four-bar linkage 113 in the released position during forward and rearward movement of panel 38 between the positions of FIGS. 5 and 6. When the linkage mechanism is moved forwardly from the position of FIG. 5, control pin 126 moves forward of the front end of channel member 90 and is then pivotable clockwise, as in FIG. 12, about pin 124 to a position where the control pin is located forward of a suitable member 128, FIG. 13, that closes the front end of channel member 90. This pivotal movement of link 120 moves its rear apertured leg forwardly, allowing link 116 to bodily shift forwardly. As link 116 shifts forwardly, links 100 and 106 can pivot clockwise about the respective pins 102 and 110 and the four-bar linkage 113 can move to the locked position, FIGS. 4 and 7, where panel 38 is shifted upwardly and seals against panel 40.

The impetus for the movement of the four-bar linkage 113 between the locked and released positions and the movement of the front and rear panels 38 and 40 between the raised and the storage positions is through a locking link 130 with three lobes. One lobe of locking link 130 is pivoted to link 100 and the shorter leg 96 of bracket 92 by pin 104, FIGS. 7, 8 and 13. As best seen in FIGS. 7 and 8, another lobe of locking link 130 supports a pin 132 received within a generally longitudinally extending slot 134 in mounting plate 84. The third lobe of locking link 130 is pivoted by a pin 136 to the front end of a drive rail generally indicated at 138, see FIGS. 7 and 8. When the four-bar linkage 113 is in the FIG. 7 locked position, a member 140 mounted on the drive rail 138 just rearward of pin 136 and having an open ended slot 142 receives a pin 144 on mounting plate 84 within the slot. The drive rail 138 extends rearwardly from pin 136 and member 140 and its rear end supports a pin 146 pivoted to a bracket 148, see FIG. 7. As seen in FIG. 16, bracket 148 includes a downwardly extending leg that rotatably supports a pin 150 mounting a roller 152. A channel member 154 receives roller 152 and is mounted on sail panel 30 extending longitudinally of the vehicle body by a pair of brackets 156 best seen in FIGS. 4 through 6. A drive mechanism guide member 158 is welded to the lower wall of channel member 154 and receives a flexible drive cable 160 surrounded by a drive spring 162, see FIG. 7, axially fixed relative to the drive cable. The forward end of drive cable 160 is suitably attached to a lower laterally extending leg of a bracket 164, FIGS. 7 and 16, with the lower leg received within a longitudinally extending slot 165 in guide member 158. The upper end of bracket 164 is apertured to receive pin 150 between channel member 154 and bracket 148 and to thus connect the drive cable 160 to the rear end of drive rail 138. As seen in FIG. 4, a conventional drive motor 166 is positioned adjacent the rear end of channel member 154 and includes a gear, not shown, engageable with the drive spring 162 to move the drive cable 160 forwardly and rearwardly along the longitudinal axis of guide member 158. As the drive cable is moved rearwardly, a conventional drive cable storage unit 168 receives and stores the drive cable 160 until a subsequent forward movement causes the drive cable to move out of the storage unit. A suitable electric circuit is selectively actuatable to energize the drive motor 166 in either the forward or rearward driving directions.

Figure 9:
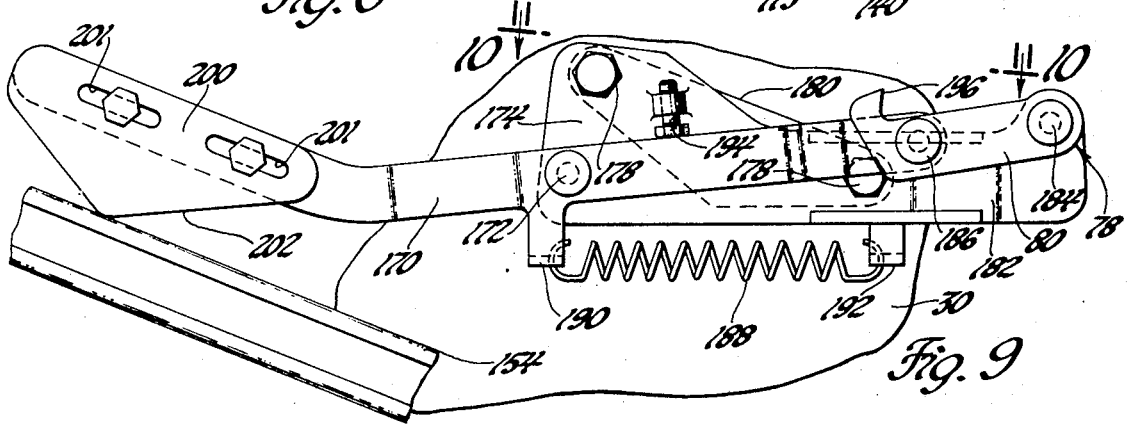
FIG. 9 is an enlarged view of a latch mechanism shown in FIGS. 4 and 5 for engaging the rear end of a mounting rail that supports the rear panel to hold the rear panel in storage position during the initial movement of the front panel toward raised position.
Figures 10, 11:
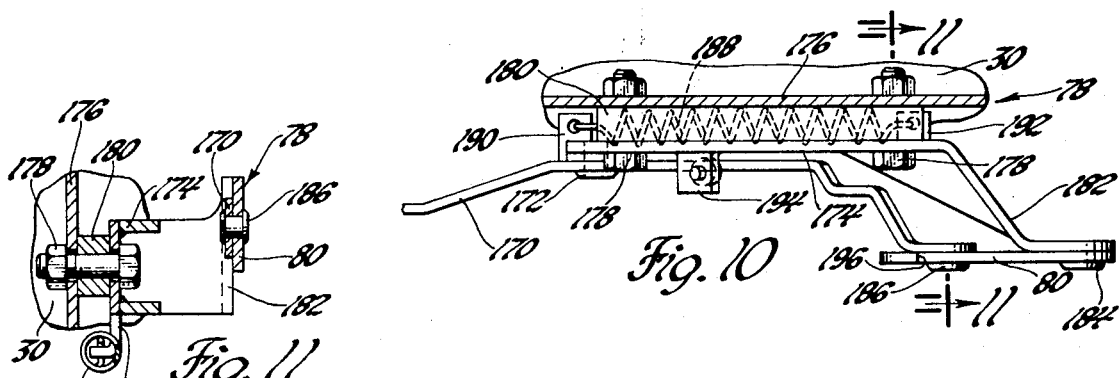
FIG. 10 is a plan view of a portion of the latch mechanism taken along line 10—10 of FIG. 9.
FIG. 11 is a sectional view of the latch mechanism taken along line 11—11 of FIG. 10.

As seen in FIGS. 9 through 11, the latch mechanism 78 includes a control arm 170 pivoted by a pin 172 to a bracket 174. A flange 176 of sail panel 30 mounts bracket 174 by way of nut and bolt arrangement 178 with a spacer 180 spacing the flange and bracket. Bracket 174 includes a rearwardly extending leg 182 which pivotally supports the rear end of bolt 80 by a pin 184. The front end of bolt 80 is pivoted to the rear end of control arm 170 by a pin 186. As best seen in FIG. 9, a spring 188 extends between flanges 190 and 192 of control arm 170 and bracket 174, respectively, and biases the control arm counterclockwise about pin 172 into engagement with an adjustable stop 194 mounted on bracket 174. As best seen in FIG. 18, with the control arm 170 in engagement with the adjustable stop 194, the forward edge of the bolt 80 is maintained in the solid line indicated latched position with a hooked nose 196 engaging the forward edge 198 of the keeper 82 at the rear end of mounting rail 44. This engagement maintains the rear panel 40 in the storage position of FIG. 6. The control arm 170 extends forwardly from pin 172 and adjustably supports a cam member 200 by nut and slot arrangements 201 best seen in FIG. 9. Cam member 200 has a lower camming surface 202 positioned adjacent the upper wall of channel member 154 when the control arm engages stop 194. A flange 204 on the rear end of drive rail 138, see the lower portion of FIG. 7, is engageable with the camming surface 202 of cam member 200 concomitant with the upward shifting of front panel 38 and the movement of four-bar linkage 113 to the FIG. 7 locked position. This engagement pivots the control arm 170 clockwise about pin 172 from the solid line indicated position of FIG. 18 to the phantom line indicated position to move the front end of bolt 80 downwardly with the hooked nose 196 out of engagement with keeper 82 of mounting rail 44. With the mounting rail 44 thus released from the latch mechanism 78, the front and rear panels 38 and 40 are free to move as a unit to the raised position, as will be described.

From the fully retracted storage position of FIG. 6, movement of the retractable top 36 to the raised position of FIG. 4 is accomplished by first actuating the electric circuit to energize drive motor 166 in a forwardly driving direction. The drive motor then moves the drive cable 160 forwardly along the longitudinal axis of guide member 158 to move the rear end of drive rail 138 from the FIG. 6 position forwardly to the FIG. 5 position where the flange 204 of drive rail 138 is just to the rear of cam member 200. During this forward movement, pin 136 at the front end of drive rail 138 biases locking link 130 clockwise about pin 132 which is located in the FIG. 8 position at the rear end of slot 134 in mounting plate 84. While this biasing tends to move the four-bar linkage 113 to the FIG. 7 locked position, the sliding engagement of control pin 126 with the side of channel member 90 through the control linkage 118 prevents this movement as previously described. When drive rail 138 moves forwardly of the position of FIGS. 5 and 8, the control pin 126 moves forward of the front end of channel member 90 and the control linkage 118 allows the four-bar linkage 113 to move to the FIG. 7 locked position. As the four-bar linkage moves to the locked position, locking link 130 bodily shifts forwardly and rotates generally clockwise as pin 132 slides to the forward end of slot 134, as in FIG. 7. In this position, the center of pin 136 is located slightly forward of a line through pin 104 and tangent to the arcuate path of movement of pin 104 about pin 102. Consequently, attempted movement of the four-bar linkage 113 toward the released position with locking link 130 in this locking position forces pin 132 against the forward end of slot 134 to prevent such movement. The locking link 130 thus assumes an overcenter locking position to maintain the four-bar linkage in the FIG. 7 locked position and to maintain the panels 38 and 40 in sealing engagement with each other. As the four-bar linkage 113 moves to the FIG. 7 locked position, slot 142 of drive rail mounted member 140 receives pin 144 to provide a driving connection to the linkage mechanism 74 and thus to the panels 38 and 40. The forward movement of drive rail 138 during the locking movement of linkage mechanism 74 moves flange 204 into engagement with the camming surface 202 of cam member 200, releasing the rear panel 40 from the latch mechanism 78 in the manner previously described and allowing forward movement of the panels 38 and 40 as a unit to the FIG. 4 raised position of retractable top 36 where a suitable switch, not shown, deenergizes drive motor 166.

Movement of the retractable top 36 from the raised position of FIG. 4 to the fully retracted storage position of FIG. 6 is accomplished by first actuating the electric circuit to energize drive motor 166 in a rearwardly driving direction. The drive rail 138 is thus moved rearwardly while the interengaged pin 144 and slot 142 provide the driving connection to the linkage mechanism 74 and panels 38 and 40. When the rear panel 40 reaches the FIG. 5 storage position, roller 48 engages the stop 77 at the rear end of channel member 50 to thus stop rear panel 40. Concomitant with this engagement, pin 126 engages the member 128 at the front end of channel member 90 to stop rearward movement of mounting plate 84 and pin 144. The stationary pin 144 and the moving slot 142 then cam the front end of the rearwardly moving drive rail 138 downwardly and the pin moves out of the slot. As the front end of drive rail 138 is cammed downwardly, pin 136 rotates locking link 130 counterclockwise about pin 104 to move pin 132 rearward of the previously described line through the pin 104. This movement unlocks locking link 130 and allows the rearwardly moving drive rail and pin 136 to bodily shift the locking link rearwardly and to rotate the locking link generally counterclockwise with pin 132 moving to the rear end of slot 134. As locking link 130 is thus unlocked, the four-bar linkage 113 moves to the FIG. 8 released position, shifting front panel 38 downwardly and moving control pin 126 laterally outboard of channel member 90. Thereafter, mounting plate 84 slides rearwardly along channel member 90 to move the front panel 38 to the FIG. 6 storage position where a suitable limit switch, not shown, deenergizes drive motor 166.

The invention thus provides an improved vehicle body retractable top.

What is claimed is:

1. In combination with a vehicle body including a windshield header and a fixed roof panel extending transversely of the vehicle body and cooperatively defining an occupant compartment roof opening, a retractable top for selectively closing the roof opening comprising, front and rear roof panels extending transversely of the vehicle body, means mounting the rear panel on the vehicle body for generally translatory movement between a storage position generally below the fixed panel and a forward raised position closing a portion of the roof opening, slidable overcenter linkage means mounting the front panel on the rear panel for generally translatory movement in spaced relationship thereto between a storage position generally below the rear panel and an intermediate position forward thereof, the overcenter linkage means being movable between a released position and an overcenter locked position to vertically bodily shift the front panel between the intermediate position and an upper raised position where the front panel sealingly engages the rear panel and where the lateral edges of the front and rear panels are continuous, the front and rear panels in the raised positions cooperatively closing the roof opening, and drive means for moving the front and rear panels between the storage and raised positions.

2. In combination with a vehicle body including a windshield header and a fixed roof panel extending transversely of the vehicle body and cooperatively defining an occupant compartment roof opening, a retractable top for selectively closing the roof opening comprising, front and rear roof panels extending transversely of the vehicle body, means mounting the rear panel on the vehicle body for generally translatory movement between a storage position generally below the fixed panel and a forward raised position closing a portion of the roof opening, slidable overcenter linkage means including a four-bar linkage slidably mounting the front panel on the rear panel for generally translatory movement in spaced relationship thereto between a storage position generally below the rear panel and an intermediate position forward thereof, the overcenter linkage means being movable between a released position and an overcenter locked position to vertically bodily shift the front panel between the intermediate position and an upper raised position where the front panel sealingly engages the rear panel and where the lateral edges of the front and rear panels are continuous, the front and rear panels in the raised positions cooperatively closing the roof opening, and drive means extending between the vehicle body and the overcenter linkage means to move the front and rear panels between the storage and raised positions.

3. In combination with a vehicle body including a windshield header and a fixed panel extending transversely of the vehicle body and cooperatively defining an occupant compartment roof opening, a retractable top for selectively closing the roof opening comprising, front and rear roof panels extending transversely of the vehicle body, means mounting the rear panel on the vehicle body for generally translatory movement between a storage position generally below the fixed panel and a forward raised position closing a portion of the roof opening, slidable overcenter linkage means including a four-bar linkage slidably mounting the front panel on the rear panel for generally translatory movement in spaced relationship thereto between a storage position generally below the rear panel and an intermediate position forward thereof, control means maintaining the overcenter linkage means in a released position during movement of the front panel between the storage position and the intermediate position, the control means allowing movement of the overcenter linkage means between the released position and an overcenter locked position to allow vertical bodily shifting movement of the front panel between the intermediate position and an upper raised position where the front panel sealingly engages the rear panel and where the lateral edges of the front and rear panels are continuous, latch means for holding the rear panel in storage position during movement of the front panel between storage and intermediate positions, the latch means releasing the rear panel for movement to raised position concomitant with the movement of the front panel to raised position, and drive means extending between the vehicle body and the overcenter linkage means to move the front and rear panels between the storage positions and the raised positions.

4. In combination with a vehicle body including a windshield header and a fixed roof panel extending transversely of the vehicle body and cooperatively defining an occupant compartment roof opening, a retractable top for selectively closing the roof opening comprising, front and rear roof panels extending transversely of the vehicle body, means mounting the rear panel on the vehicle body for generally translatory movement between a storage position generally below the fixed panel and a forward raised position closing a portion of the roof opening, a four-bar linkage connected to the front panel, means slidably mounting the four-bar linkage on the rear panel to mount the front panel on the rear panel for movement in spaced relationship thereto between a storage position generally below the rear panel and an intermediate position forward thereof, control means for maintaining the four-bar linkage in a released position during movement of the front panel between the storage and intermediate positions, the control means allowing the four-bar linkage to move between the released position and a locked position to vertically bodily shift the front panel between the intermediate position and a raised position where the front panel sealingly engages the rear panel and where the lateral edges of the front and rear panels are continuous, a locking link pivotally and slidably connected to the four-bar linkage and movable between a released position and an overcenter locking position to selectively maintain the four-bar linkage in locked position and the front panel in raised position, latch means for holding the rear panel in storage position during movement of the front panel between the storage and intermediate positions, the latch means releasing the rear panel for movement to raised position concomitant with the movement of the front panel to raised position, and drive means extending between the vehicle body and the locking link to move the front and rear panels between the storage positions and the raised positions.

5. In combination with a vehicle body including a windshield header and a fixed roof panel extending transversely of the vehicle body and cooperatively defining an occupant compartment roof opening, a retractable top for selectively closing the roof opening comprising, front and rear roof panels extending transversely of the vehicle body, a mounting rail fixedly secured to the rear panel and slidably mounted on the vehicle body to mount the rear panel for generally translatory movement between a storage position generally below the fixed panel and a forward raised position closing a portion of the roof opening, a four-bar linkage connected to the front panel, means slidably mounting the four-bar linkage on the rear panel to mount the front panel on the rear panel for movement in spaced relationship thereto between a storage position generally below the rear panel and an intermediate position forward thereof, control means for maintaining the four-bar linkage in a released position during movement of the front panel between the storage and intermediate positions, the control means allowing the four-bar linkage to move between the released position and a locked position to vertically bodily shift the front panel between the intermediate position and an upper raised position where the front panel sealingly engages the rear panel and where the lateral edges of the front and rear panels are continuous, a locking link pivotally and slidably connected to the four-bar linkage and movable between a released position and overcenter locking position to selectively maintain the four-bar linkage in locked position and the front panel in raised position, latch means for holding the rear panel in storage position, drive means including a drive rail extending between the vehicle body and the locking link to move the front and rear panels between the storage and raised positions, means on the drive rail for camming the latch means to an unlatched position to release the rear panel upon movement of the front panel to raised position, and pin and slot means between the drive rail and the four-bar linkage, the pin and slot means being interengaged upon movement of the four-bar linkage to locked position to provide a driving connection between the drive rail and the locked four-bar linkage, the pin and slot means being cammed out of interengagement during rearward movement of the front and rear panels upon the rear panel reaching storage position and moving the locking link to the released position to allow the rearwardly moving drive rail to move the four-bar linkage to released position and to subsequently move the front panel to storage position.

* * * * *